US011909118B2

(12) United States Patent
Jia et al.

(10) Patent No.: US 11,909,118 B2
(45) Date of Patent: Feb. 20, 2024

(54) ANTENNA

(71) Applicant: Shanghai Tianma Micro-Electronics Co., Ltd., Shanghai (CN)

(72) Inventors: Zhenyu Jia, Shanghai (CN); Kerui Xi, Shanghai (CN); Baiquan Lin, Shanghai (CN); Linzhi Wang, Shanghai (CN); Qinyi Duan, Shanghai (CN); Zuocai Yang, Shanghai (CN); Feng Qin, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 32 days.

(21) Appl. No.: 17/547,647

(22) Filed: Dec. 10, 2021

(65) Prior Publication Data

US 2022/0102871 A1 Mar. 31, 2022

(30) Foreign Application Priority Data

Jun. 30, 2021 (CN) ......................... 202110736336.4

(51) Int. Cl.
*H01Q 21/00* (2006.01)
*H01Q 21/06* (2006.01)
*H01Q 3/44* (2006.01)
*H01Q 9/04* (2006.01)

(52) U.S. Cl.
CPC ........... *H01Q 21/0075* (2013.01); *H01Q 3/44* (2013.01); *H01Q 9/0457* (2013.01); *H01Q 21/0087* (2013.01); *H01Q 21/065* (2013.01)

(58) Field of Classification Search
CPC ............................ H01Q 21/0075; H01Q 1/38
USPC .......................................................... 343/700
See application file for complete search history.

(56) References Cited

U.S. PATENT DOCUMENTS 6,259,407 B1 * 7/2001 Tran ........................ H01Q 1/38 343/702
9,391,375 B1 * 7/2016 Bales .................. H01Q 21/064
11,088,468 B2 * 8/2021 Joung ................. H01Q 1/2283
11,196,172 B2 * 12/2021 Xi ............................ H01Q 3/44
2014/0340279 A1 * 11/2014 Bayram .................. H01Q 1/24 703/1
2020/0373673 A1 * 11/2020 Hashemi ............ H01Q 21/0025
2022/0373837 A1 * 11/2022 Zhang ...................... H01Q 1/40

FOREIGN PATENT DOCUMENTS

CN 103840243 B 3/2016
CN 206602182 U 10/2017
CN 109149095 A 1/2019
CN 110729548 A 1/2020
(Continued)

*Primary Examiner* — Ricardo I Magallanes
*Assistant Examiner* — Brandon Sean Woods
(74) *Attorney, Agent, or Firm* — KDW Firm PLLC

(57) ABSTRACT

Provided is an antenna. The antenna includes a first metal electrode, a second metal electrode, and a dielectric functional layer. The first metal electrode and the second metal electrode are located on two opposite sides of the dielectric functional layer, respectively; and the first metal electrode includes a plurality of transmission electrodes. The antenna further includes a flexible coplanar waveguide and a feed network. The flexible coplanar waveguide is electrically connected to the feed network and configured to feed an electrical signal to the feed network.

4 Claims, 15 Drawing Sheets

(56) References Cited

FOREIGN PATENT DOCUMENTS

| | | | | |
|---|---|---|---|---|
| CN | 110824734 | A | | 2/2020 |
| CN | 108400426 | B | | 12/2020 |
| CN | 112909560 | A | | 6/2021 |
| CN | 114696079 | A | * | 7/2022 |
| WO | WO-2021145734 | A1 | * | 7/2021 |

* cited by examiner

--Prior Art--

ANTENNA

CROSS-REFERENCE TO RELATED APPLICATION

This application claims priority to Chinese Patent Application No. 202110736336.4 filed Jun. 30, 2021, the disclosure of which is incorporated herein by reference in its entirety.

TECHNICAL FIELD

Embodiments of the present disclosure relate to the technical field of communication, and in particular, to an antenna.

BACKGROUND

An antenna is an important radio device that transmits and receives electromagnetic waves. It can be said that without the antenna, there is no communication device.

A phased array antenna is an upgrade of a traditional antenna. The phased array antenna can quickly and flexibly change the antenna beam and pointing shape according to a target and can transmit and receive electromagnetic waves in various frequency bands in the entire space, that is, the phased array antenna can accurately complete tasks such as searching, tracking, capturing, and recognition of multiple targets.

However, the phased array antenna in the existing art has the problem of large frame.

SUMMARY

The present disclosure provides an antenna so as to reduce the frame size of the antenna.

In a first aspect, embodiments of the present disclosure provide an antenna. The antenna includes a first metal electrode, a second metal electrode, and a dielectric functional layer.

The first metal electrode and the second metal electrode are located on two opposite sides of the dielectric functional layer, respectively; and the first metal electrode includes a plurality of transmission electrodes.

The antenna further includes a flexible coplanar waveguide and a feed network.

The flexible coplanar waveguide is electrically connected to the feed network and configured to feed an electrical signal to the feed network.

In a second aspect, embodiments of the present disclosure further provide a manufacturing method of an antenna. The manufacturing method of an antenna includes the steps described blow.

An antenna base plate and a flexible coplanar waveguide are provided, where the antenna base plate includes a first metal electrode, a second metal electrode, a dielectric functional layer, and a feed network; the first metal electrode and the second metal electrode are located on two opposite sides of the dielectric functional layer, respectively; and the first metal electrode includes a plurality of transmission electrodes.

The flexible coplanar waveguide is disposed on the antenna base plate, where the flexible coplanar waveguide is electrically connected to the feed network and configured to feed an electrical signal to the feed network.

In a third aspect, embodiments of the present disclosure further provide a manufacturing method of an antenna. The manufacturing method of an antenna includes the steps described blow.

A first flexible substrate and a dielectric functional layer which is provided with a second metal electrode are provided.

A first metal electrode is formed on the first flexible substrate.

The first metal electrode is patterned to form a central band, a grounding band, a feed network, and a transmission electrode.

The first flexible substrate is attached to a side of the dielectric functional layer facing away from the second metal electrode, where the central band, the grounding band, and the first flexible substrate form a flexible coplanar waveguide.

In a fourth aspect, embodiments of the present disclosure further provide a manufacturing method of an antenna. The manufacturing method of an antenna includes the steps described blow.

A first base plate, a rigid support layer, and a dielectric functional layer which is provided with a first metal electrode and a second metal electrode are provided; where the first metal electrode and the second metal electrode are located on two opposite sides of the dielectric functional layer.

A second flexible substrate is formed at the rigid support layer.

A third metal electrode is formed on a side of the second flexible substrate facing away from the rigid support layer.

The third metal electrode is patterned to form a central band, a grounding band, and a feed network.

The second flexible substrate is attached to a side of the first base plate facing away from the second metal electrode, where the central band, the grounding band, and the second flexible substrate form a flexible coplanar waveguide.

DETAILED DESCRIPTION

Figure 1:
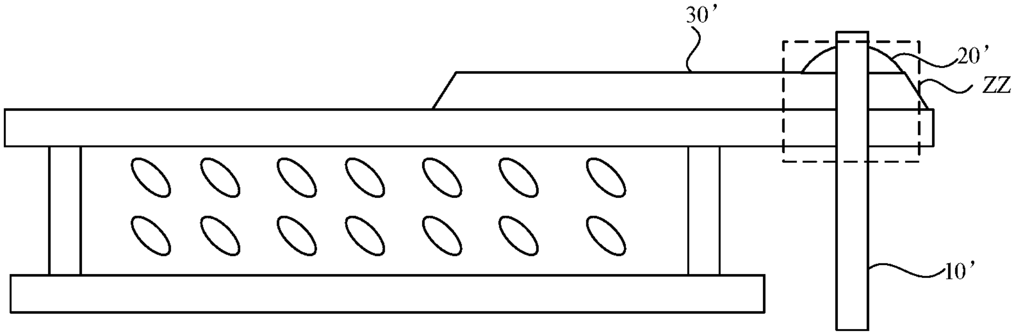
FIG. 1 is a structure diagram of a liquid crystal antenna in the related art.

The present disclosure is further described hereinafter in detail in conjunction with drawings and embodiments. It is to be understood that embodiments described hereinafter are intended to explain the present disclosure and not to limit the present disclosure. Additionally, it is to be noted that for ease of description, only part, not all, of structures related to the present disclosure are illustrated in the drawings.

It is to be noted that if not in conflict, the embodiments described below may be combined with each other. The thicknesses of various film layers in the drawings corresponding to the embodiments described below are only illustrative and are not related to each other. Those skilled in the art can set the thicknesses of each film layer according to actual situations.

FIG. 1 is a structure diagram of a liquid crystal antenna in the related art. As shown in FIG. 1, the liquid crystal antenna achieves the power supply of a radio frequency signal in a manner that a feeding port is disposed at an edge of the liquid crystal antenna. Specifically, with continued reference to FIG. 1, the liquid crystal antenna includes a radio frequency signal interface 10' and a pad 20'. One end of the radio frequency signal interface 10' is connected to a feed network 30' and is fixed by the pad 20', and the other end of the radio frequency signal interface 10' is configured to connect an external circuit such as a coaxial cable connector.

Due to the large size of the coaxial cable connector, the antenna has to be manufactured with a large step region (such as region ZZ in FIG. 1) for the connection of the coaxial cable connector. Undoubtedly, the frame size of the antenna will be increased in this manner, which is not conducive to the miniaturization of the antenna and is not conducive to splicing between antennas when the antenna is used for splicing.

Thus, embodiments of the present disclosure provide an antenna. The antenna includes a first metal electrode, a second metal electrode, and a dielectric functional layer. The first metal electrode and the second metal electrode are located on two opposite sides of the dielectric functional layer, respectively; and the first metal electrode includes a plurality of transmission electrodes. The antenna further includes a flexible coplanar waveguide and a feed network. The flexible coplanar waveguide is electrically connected to the feed network and configured to feed an electrical signal to the feed network.

According to the antenna provided by the embodiment, the flexible coplanar waveguide is disposed between a coaxial cable connector and the feed network, and the coaxial cable connector achieves the feeding of a radio frequency signal through the flexible coplanar waveguide. In this manner, the space originally used for setting a radio frequency signal interface on the antenna can be saved, thereby achieving the narrower frame. When the antenna is applied to a device, the miniaturization of the device is facilitated; and when the antenna is used for splicing, splicing between antennas is facilitated.

The above is the core concept of the present disclosure, and technical solutions in embodiments of the present disclosure will be described clearly and completely in conjunction with the drawings in embodiments of the present disclosure. Based on embodiments of the present disclosure, all other embodiments obtained by those of ordinary skill in the art without creative work are within the scope of the present disclosure.

Figure 2:
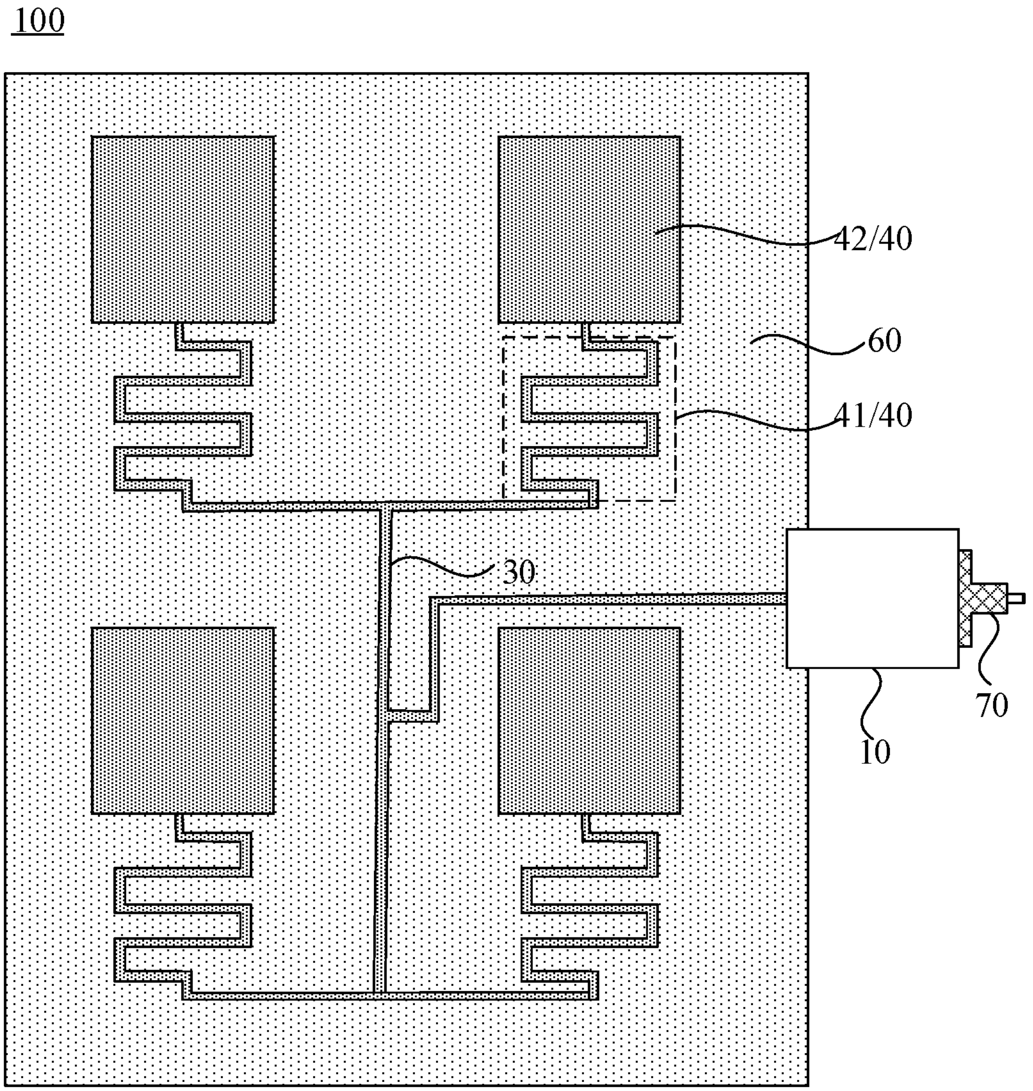
FIG. 2 is a top view of an antenna according to an embodiment of the present disclosure.
Figure 3:
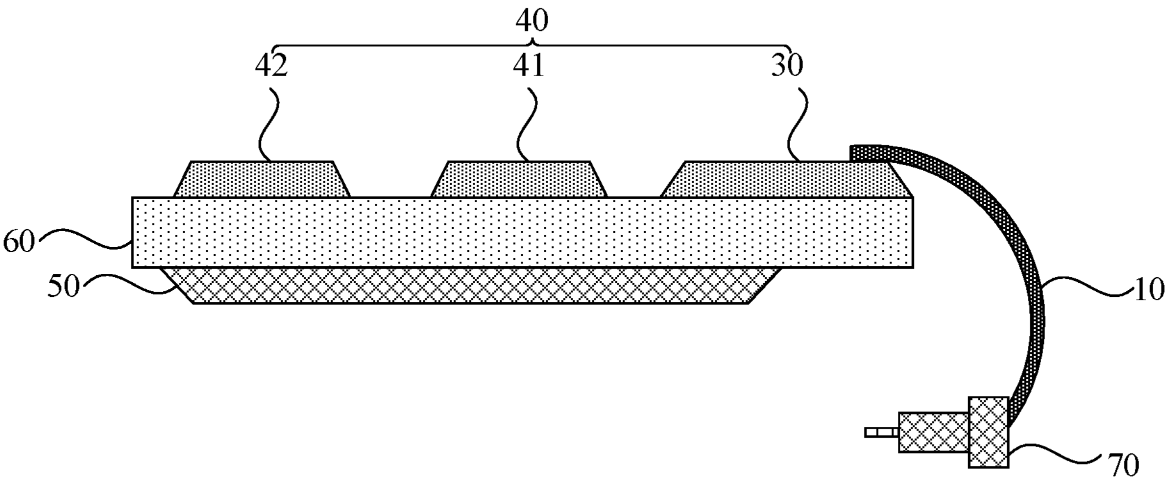
FIG. 3 is a sectional view of an antenna according to an embodiment of the present disclosure.

FIG. 2 is a top view of an antenna according to an embodiment of the present disclosure. FIG. 3 is a sectional view of an antenna according to an embodiment of the present disclosure. As shown in FIG. 2 and FIG. 3, an antenna 100 provided in embodiments of the present disclosure includes a first metal electrode 40, a second metal electrode 50, and a dielectric functional layer 60. The first metal electrode 40 and the second metal electrode 50 are located on two opposite sides of the dielectric functional layer 60, respectively; and the first metal electrode 40 includes a plurality of transmission electrodes 41. A flexible coplanar waveguide 10 and a feed network 30 are further included in the antenna 100. One end of the flexible coplanar waveguide 10 is, for example, electrically connected to a coaxial cable connector 70, and the other end of the flexible coplanar waveguide 10 is electrically connected to the feed network 30. The flexible coplanar waveguide 10 receives an electrical signal from the coaxial cable connector 70 and feeds the received electrical signal to the feed network 30. The feed network 30 is distributed in an arborescent shape and includes multiple branches. One branch is electrically connected to one transmission electrode 41. The feed network 30 transmits the electrical signal to each transmission electrode 41. The dielectric constant of the dielectric functional layer 60 is changed so that the phase of the electrical signal transmitted on the transmission electrodes 41 is shifted. Thus, the phase shift function of the electrical signal is achieved.

The dielectric functional layer 60 may be, for example, a functional layer whose dielectric constant can be changed such as a liquid crystal layer or a photo-dielectric change layer. When the dielectric functional layer 60 is the liquid crystal layer, the transmission electrode 41 is supplied with a positive voltage or a negative voltage, the second metal electrode 50 is grounded, and the transmission electrode 41 and the second metal electrode 50 generate an electric field so as to drive a liquid crystal molecule in the liquid crystal layer to deflect. The phase of the electrical signal transmitted on the transmission electrode 41 is changed through the deflection of the liquid crystal molecule, thus achieving the phase shift function of the electrical signal. When the dielectric functional layer 60 is the photo-dielectric change layer, for example, the dielectric constant of the photo-dielectric change layer may be changed through a control over the light intensity; the dielectric constant of the photo-dielectric change layer may also be changed through a control over the wavelength; and the embodiment is not limited to the above as long as the dielectric constant of the photo dielectric change layer can be changed. The dielectric constant of the photo-dielectric change layer is changed, and the phase of the electrical signal transmitted on the transmission electrode 41 is shifted, so that the phase of the electrical signal is changed, and the phase shift function of the electrical signal is achieved. Exemplarily, the material of a photo-dielectric change unit may include an azo dye, an azo polymer, or the like.

The size of the coaxial cable connector 70 is large so that the antenna has to require a large step region for setting the radio frequency signal interface so as to achieve the connection of the coaxial cable connector 70. The existence of the step region increases the frame size of the antenna. In this embodiment, the flexible coplanar waveguide 10 is provided so that the coaxial cable connector 70 transmits the electrical signal to the feed network 30 through the flexible coplanar waveguide 10. There is no need to provide a large step for setting the radio frequency signal interface. The space originally used for setting the radio frequency signal interface on the antenna can be saved, and merely a small region is required to be reserved so as to achieve the connection between the flexible coplanar waveguide 10 and the feed network 30, thus achieving the narrower frame.

It is to be noted that the specific size of the small reserved region is not specifically limited in the embodiment and can be set by those skilled in the art according to actual situations of a product, as long as the connection between the flexible coplanar waveguide 10 and the feed network 30 can be achieved without affecting the transmission of the electrical signal.

It is to be noted that the transmission electrode 41 may be of a block shape, a linear shape, or the like, which is not specifically limited in the embodiment. FIG. 2 illustrates merely an example in which the transmission electrode 41 is of the linear shape. When the transmission electrode 41 is of the linear shape, the path for transmitting the electrical signal is lengthened and the influence of the dielectric functional layer 60 on the electrical signal is increased. It is to be understood that when the transmission electrode 41 is of the linear shape, the transmission electrode 41 may be of a serpentine shape as shown in FIG. 2, a W shape formed by multiple connected straight segments (not shown in the figure), a U shape connected to each other (not shown in the figure), or the like.

Optionally, the electrical signal transmitted by the transmission electrode 41 may be, for example, a high-frequency signal whose frequency is greater than or equal to 1 GHz and thus can be applied to a device for long-distance and high-speed propagation such as a satellite and a base station; the antenna frame is narrow, that is, the antenna has a small volume, so when the antenna is applied to the device, the miniaturization of the device is facilitated, and when the antenna is used for splicing, splicing between antennas is facilitated. In this manner, the antenna has a high commercial application value.

It is to be understood that the electrical signals transmitted by the transmission electrodes 41 include and are not limited to the preceding examples.

Optionally, a fixed potential is provided for the second metal electrode 50. For example, the second metal electrode 50 is grounded.

In practice, there may be many specific positions of the feed network and the flexible coplanar waveguide. Next, according to a position relationship between the transmission electrode and the feed network, the specific positions of the feed network and the flexible coplanar waveguide are illustrated. The content described below is not intended to limit the present disclosure.

First, an example in which the transmission electrode and the feed network are disposed at the same layer is used for illustration.

Optionally, with continued reference to FIG. 2 and FIG. 3, the first metal electrode 40 further includes the feed network 30.

In the embodiment, the feed network 30 is disposed at the same layer as the transmission electrode 41, and there is no need to provide a separate metal layer for providing the feed network 30. When the transmission electrode 41 is manufactured, the feed network 30 is manufactured at the same time. The process steps are simplified and the thinning of the antenna is facilitated. When the feed network 30 is disposed at the same layer as the transmission electrode 41, referring to FIG. 2, the feed network 30 is electrically connected, for example, directly to the transmission electrode 41, so that the electrical signal can be directly transmitted to the transmission electrode 41 without coupling, thus avoiding the problem of electrical signal loss caused by the coupling.

It is to be understood that when the feed network 30 is disposed at the same layer as the transmission electrode 41, the structure of the antenna can be set according to the type of the dielectric functional layer 60 so as to change the manner in which the electrical signal is transmitted between the feed network 30 and the transmission electrode 41. For example, when the dielectric functional layer 60 is a photo-dielectric change layer, the feed network 30 is directly connected to the transmission electrode 41, and the electrical signal on the feed network 30 is directly transmitted to the transmission electrode 41. When the dielectric functional layer 60 is a liquid crystal layer, the feed network 30 is not connected to the transmission electrode 41 but a gap exists corresponding to a hollow in a direct current block (not shown in FIGS. 2 and 3) in the second metal electrode 50. Through the hollow, the electrical signal on the feed network 30 is coupled to the direct current block and then coupled to the transmission electrode 41. Setting in the embodiment described below is also the same as the setting described above. Repetition will not be made here.

Optionally, with continued reference to FIGS. 2 and 3, the first metal electrode 40 further includes multiple radiators 42; the radiators 42, the transmission electrodes 41, and the feed network 30 are disposed at the same layer, and the transmission electrode 41 is electrically connected to the radiator 42.

In the embodiment, the radiators 42, the feed network 30, and the transmission electrodes 41 are disposed at the same layer, and there is no need to provide a separate metal layer for providing the radiators 42. When the transmission electrodes 41 are manufactured, the feed network 30 and the radiators 42 are manufactured at the same time. The process steps are simplified and the thinning of the antenna is facilitated. Additionally, the first metal electrode 40 includes the radiators 42, the transmission electrodes 41, and the feed network 30; the feed network 30 is electrically connected to the transmission electrodes 41, and the transmission electrode 41 is electrically connected to the radiator 42, so that the feed network 30 directly transmits the electrical signal to the transmission electrode 41 without coupling, and the electrical signal is then transmitted through the transmission electrode 41 and radiated outward directly through the radiator 42 without the coupling.

Figure 4:
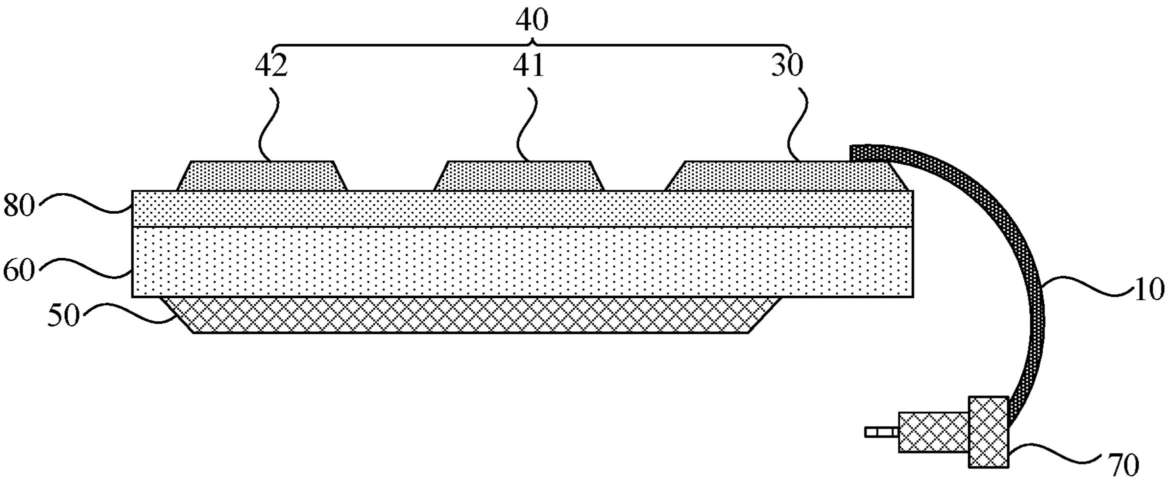
FIG. 4 is a sectional view of another antenna according to an embodiment of the present disclosure.

Optionally, FIG. 4 is a sectional view of another antenna according to an embodiment of the present disclosure. As shown in FIG. 4, the antenna 100 provided in embodiments of the present disclosure further includes a first flexible substrate 80 on which the first metal electrode 40 is disposed.

The first flexible substrate 80 may, for example, include a flexible material such as polyimide. For example, the first flexible substrate 80 may be provided on a support base plate, the first metal electrode 40 is then provided on the side of the first flexible substrate 80 facing away from the support base plate, the support base plate is then peeled off, and the manufactured first flexible substrate 80 and the first metal electrode 40 located on the first flexible substrate 80 are attached to the side of the dielectric functional layer 60 facing away from the second metal electrode 50. Such arrangement has the following advantage: the dielectric functional layer 60 is prevented from being damaged during the manufacturing process of the first metal electrode 40, thereby avoiding affecting the change of the phase of the electrical signal.

Optionally, the second metal electrode 50 may also be provided in the same manner on the side of the dielectric functional layer 60 facing away from the first metal electrode 40, that is, the side of the second metal electrode 50 facing towards the dielectric functional layer 60 is also provided with a flexible substrate (not shown in the figure), which will not be repeated here since the manufacturing process is the same.

It is to be noted that when the manufactured first flexible substrate 80 and the first metal electrode 40 located on the first flexible substrate 80 are attached to the side of the dielectric functional layer 60 facing away from the second metal electrode 50, the first flexible substrate 80 may be located on the side of the first metal electrode 40 facing towards the dielectric functional layer 60 or on the side of the first metal electrode 40 facing away from the dielectric functional layer 60, which is not limited in the embodiment and may be set according to actual situations by those skilled in the art.

Figure 5:
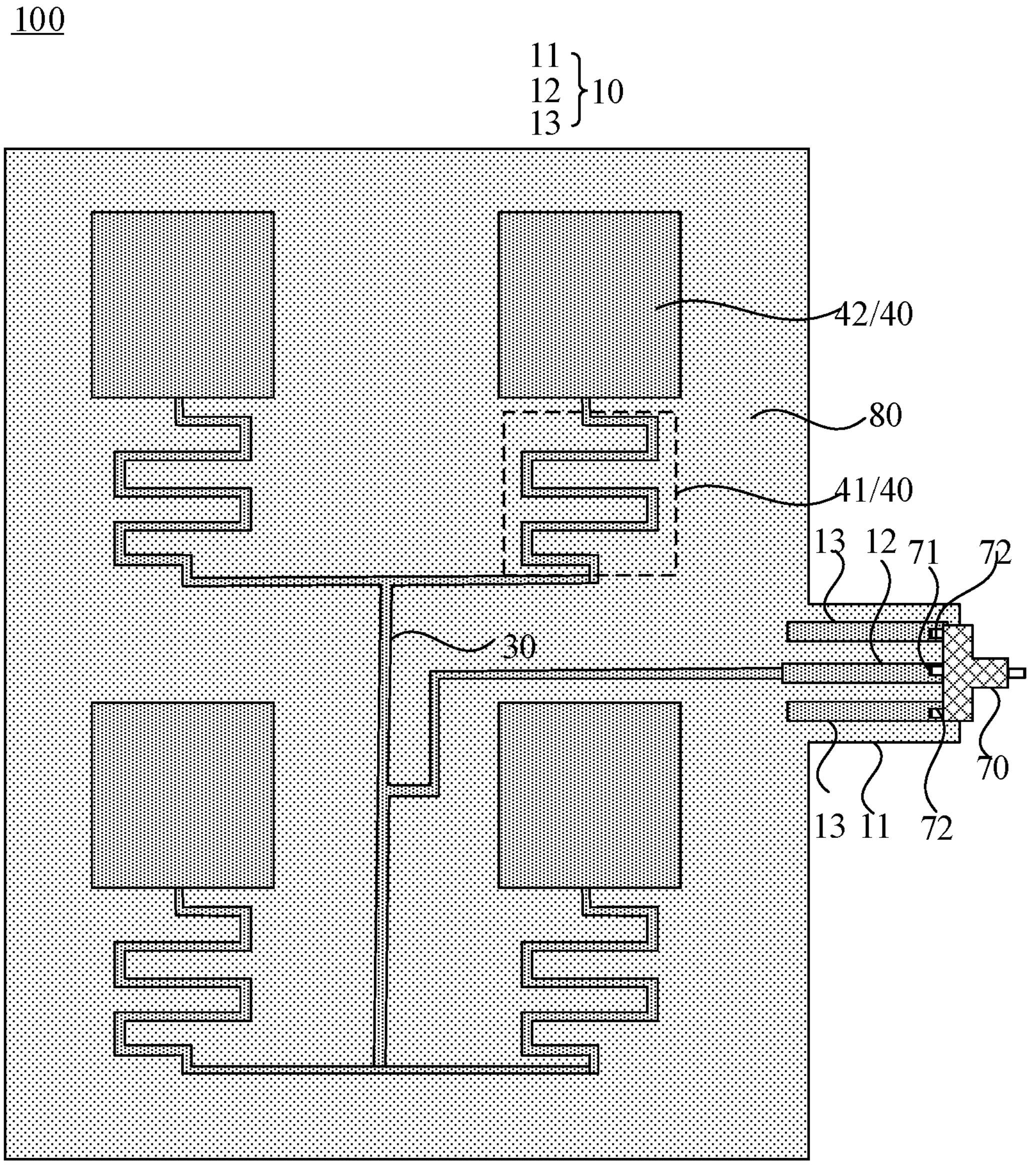
FIG. 5 is a top view of another antenna according to an embodiment of the present disclosure.
Figure 6:
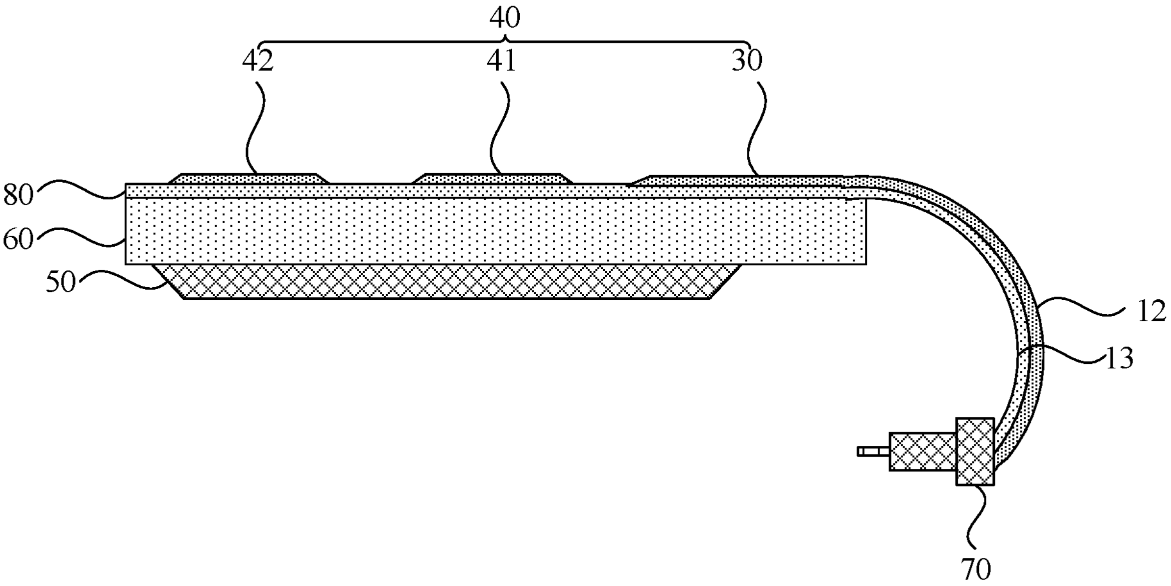
FIG. 6 is a sectional view of another antenna according to an embodiment of the present disclosure.

Optionally, FIG. 5 is a top view of another antenna according to an embodiment of the present disclosure; FIG. 6 is a sectional view of another antenna according to an embodiment of the present disclosure. As shown in FIGS. 5 and 6, the flexible coplanar waveguide 10 provided in embodiments of the present disclosure includes a flexible support layer 11 and a central band 12 and a grounding band 13 which are located on the flexible support layer 11; the first flexible substrate 80 and the flexible support layer 11 are an integrated structure; and the first metal electrode 40 further includes the central band 12 and the grounding band 13.

It is to be understood that the flexible coplanar waveguide 10 includes the flexible support layer 11 and the central band 12 and the grounding band 13 which are located on the flexible support layer 11. As can be seen from the above, during the manufacturing of the antenna, the first flexible substrate 80 may be first formed on the support base plate, and the first metal electrode 40 is then formed on the first flexible substrate 80. The flexible support layer 11 of the flexible coplanar waveguide 10 may be, for example, a flexible material such as polyimide. The first flexible substrate 80 may be, for example, a flexible material such as polyimide. That is, the first flexible substrate 80 and the flexible support layer 11 may be made of the same material. The central band 12 and the grounding band 13 are metal, for example, copper. The first metal electrode 40 may also be metal, for example, copper. That is, the first metal electrode 40, the central band 12, and the grounding band 13 may be made of the same material. Thus, in the embodiment of the present disclosure, when the first flexible substrate 80 is manufactured, the flexible support layer 11 of the flexible coplanar waveguide 10 is manufactured at the same time; when the first metal electrode 40 is manufactured on the first flexible substrate 80, the related metal structure of the flexible coplanar waveguide 10 is manufactured at the same time, for example, the central band 12 and the grounding band 13 are formed. Thus, the process is simplified.

Additionally, since the related metal structure of the flexible coplanar waveguide 10 and the first metal electrode 40 on the first flexible substrate 80 are disposed at the same layer, the related metal structure of the flexible coplanar waveguide 10 and the feed network 30 can be directly electrically connected to each other without an electrical connection through welding. Thus, there is no need to provide a frame for achieving the connection between the flexible coplanar waveguide 10 and the feed network 30, and the frame of the antenna 100 is further reduced.

It is to be understood that the coaxial cable connector 70 includes a radio frequency terminal 71 and a ground terminal 72. The radio frequency terminal 71 and the ground terminal 72 may be connected to the central band 12 and the grounding band 13 of the flexible coplanar waveguide 10, respectively, for example, in a manner of welding, so as to achieve the transmission of the electrical signal.

Figure 7:
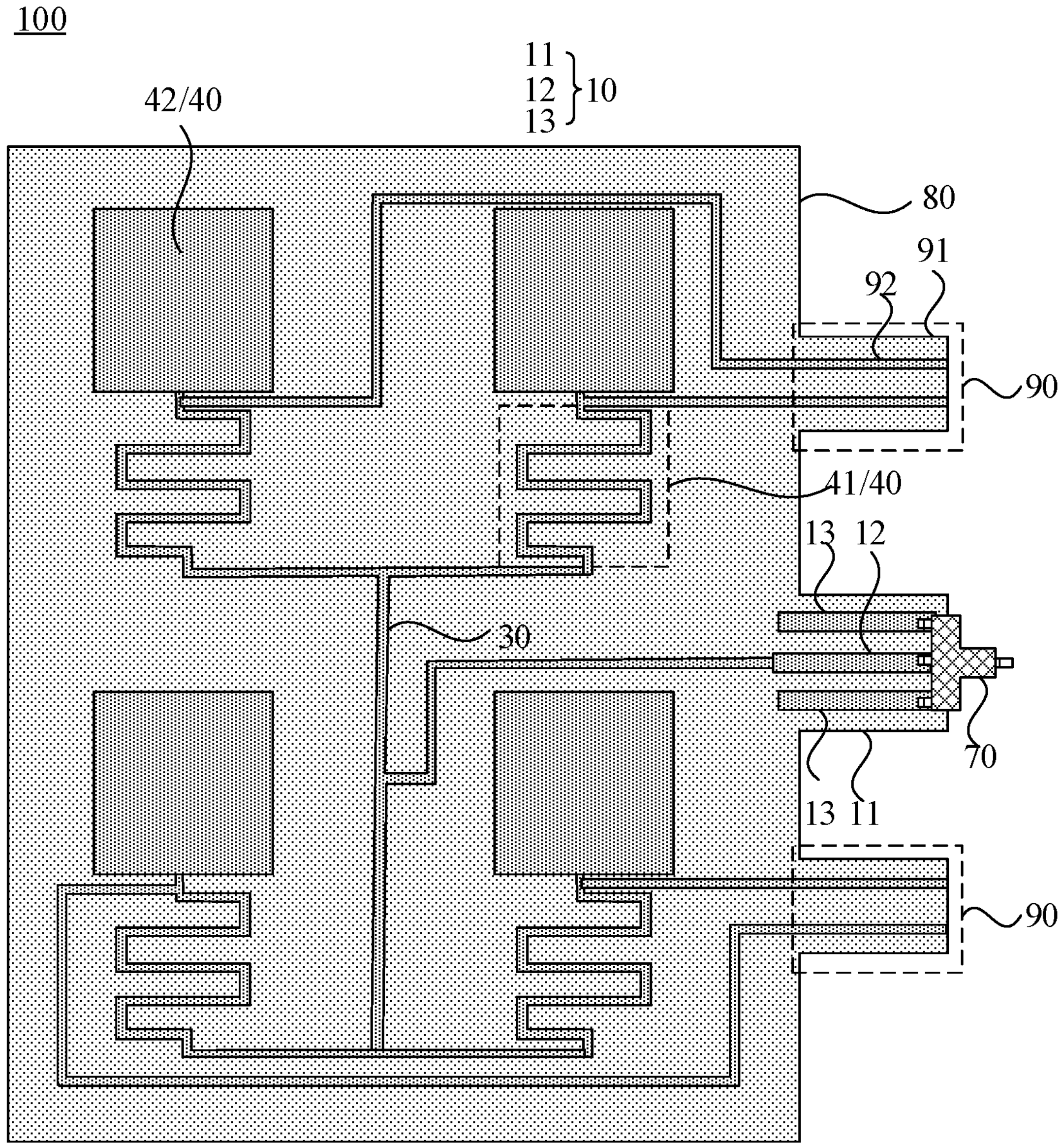
FIG. 7 is a top view of another antenna according to an embodiment of the present disclosure.

Optionally, FIG. 7 is a top view of another antenna according to an embodiment of the present disclosure. As shown in FIG. 7, the antenna 100 provided in embodiments of the present disclosure further includes a flexible circuit board 90; the flexible circuit board 90 includes a second flexible substrate 91 and a metal transmission line 92 located on the second flexible substrate 91; the first flexible substrate 80, the second flexible substrate 91, and the flexible support layer 11 are an integrated structure; and the first metal electrode 40 further includes the metal transmission line 92.

When a positive voltage or a negative voltage transmitted on the transmission electrode 41 and a fixed signal transmitted by the second metal electrode 50 are needed to change the dielectric constant of the dielectric functional layer 60, the transmission electrode 41 not only transmits an electrical signal, but also receives a positive voltage or a negative voltage. That is, one end of the flexible circuit board 90 is connected to the transmission electrode 41, and the other end of the flexible circuit board 90 is connected to an external driver circuit board so that supply of the positive voltage or the negative voltage can be achieved. The driver circuit board may include, for example, a printed circuit board (PCB) or the like, which is not specifically limited in the embodiment. In the existing art, a binding terminal is disposed in the step region of the antenna so that the transmission electrode 41 and the flexible circuit board are electrically connected to each other through the binding terminal. That is, the antenna in the existing art needs to be provided with a step region for setting the binding terminal. The narrowing of the antenna frame is affected.

It is considered that the flexible circuit board 90 includes the second flexible substrate 91 and the metal transmission line 92 located on the second flexible substrate 91. Moreover, the second flexible substrate 91 may be, for example, a flexible material such as polyimide. That is, the second flexible substrate 91, the first flexible substrate 80, and the flexible support layer 11 may be made of the same material. The metal transmission line 92 is also metal, for example, copper. That is, the metal transmission line 92, the first metal electrode 40, the central band 12, and the grounding band 13 may be made of the same material. Thus, in the embodiment of the present disclosure, when the first flexible substrate 80 is manufactured, the second flexible substrate 91 of the flexible circuit board 90 and the flexible support layer 11 of the flexible coplanar waveguide 10 are manufactured at the same time; when the first metal electrode 40 is manufactured on the first flexible substrate 80, the metal transmission line 92 of the flexible circuit board 90 and the related metal structure of the flexible coplanar waveguide 10 are manufactured at the same time, for example, the central band 12 and the grounding band 13 are formed. Thus, the process is simplified.

Additionally, since the metal transmission line 92 of the flexible circuit board 90, the related metal structure of the flexible coplanar waveguide 10, and the first metal electrode 40 on the first flexible substrate 80 are disposed at the same layer, the related metal structure of the flexible coplanar waveguide 10 and the feed network 30 can be directly electrically connected to each other without an electrical connection through welding. Moreover, the metal transmission line 92 of the flexible circuit board 90 is directly electrically connected to the transmission electrode 41 without requiring a binding terminal. Therefore, there is no need to provide a frame for achieving the connection between the flexible coplanar waveguide 10 and the feed network 30, and there is no need to provide a frame for the binding terminal. That is, the antenna 100 provided in the embodiment of the present disclosure has no frame at all.

The position relationship between the feed network 30 and the flexible coplanar waveguide 10 when the transmission electrode 41 and the feed network 30 are disposed at the same layer is described in the above example. Optionally, the transmission electrode 41 and the feed network 30 may also be disposed at different layers.

The position relationship between the feed network 30 and the flexible coplanar waveguide 10 when the transmission electrode 41 and the feed network 30 are disposed at different layers is described below.

Figure 8:
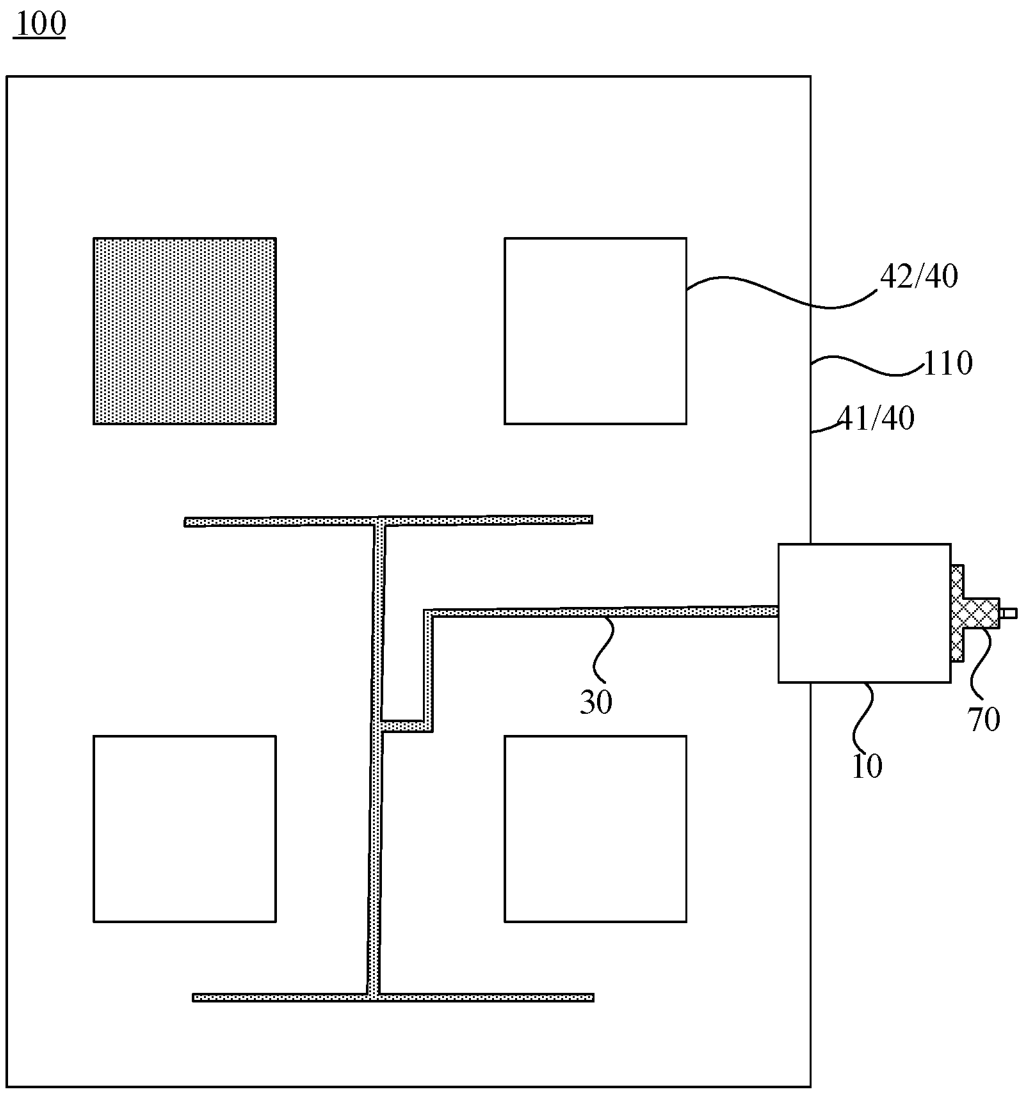
FIG. 8 is a top view of another antenna according to an embodiment of the present disclosure.
Figure 9:
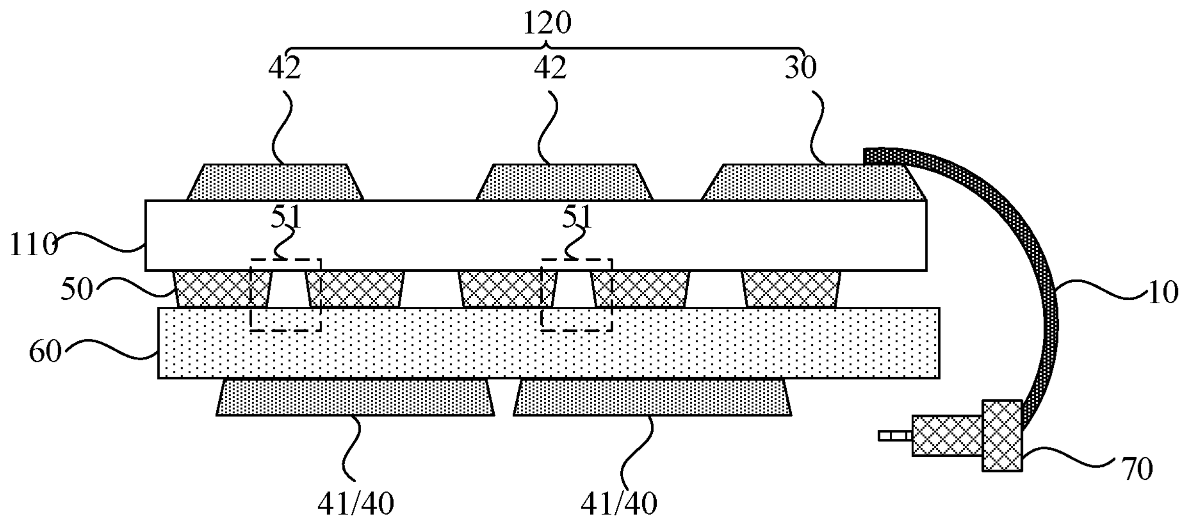
FIG. 9 is a sectional view of another antenna according to an embodiment of the present disclosure.

Optionally, FIG. 8 is a top view of another antenna according to an embodiment of the present disclosure, and FIG. 9 is a sectional view of another antenna according to an embodiment of the present disclosure. As shown in FIGS. 8 and 9, the antenna 100 provided in embodiments of the present disclosure further includes a first base plate 110 and a third metal electrode 120. The second metal electrode 50 is located on a side of the first base plate 110 facing towards the dielectric functional layer 60. The third metal electrode 120 is located on a side of the first base plate 110 facing away from the second metal electrode 50. The third metal electrode 120 includes the feed network 30.

In the embodiment, the third metal electrode 120 is further included and includes the feed network 30 which is connected to the coaxial cable connector 70 through the flexible coplanar waveguide 10. In this manner, the position of the feed network 30 is more flexible.

Optionally, with continued reference to FIGS. 8 and 9, the third metal electrode 120 further includes a plurality of radiators 42. The third metal electrode 120 further includes the plurality of radiators 42, that is, the radiators 42 and the feed network 30 are disposed at the same layer.

In the embodiment, the radiators 42 and the feed network 30 are disposed at the same layer, and there is no need to provide a separate metal layer for providing the radiators 42. When the feed network 30 is manufactured, the radiators 42 are manufactured at the same time. The process steps are simplified and the thinning of the antenna is facilitated.

Exemplarily, the antenna 100 operates in such a way that, for example, the coaxial cable connector 70 transmits an electrical signal to the feed network 30 through the flexible coplanar waveguide 10, and the electrical signal is coupled to the transmission electrode 41 through the feed network 30 and the dielectric functional layer 60. The electrical signal is transmitted on the transmission electrode 41, and at the same time, the dielectric constant of the dielectric functional layer 60 is changed so that the phase of the electrical signal transmitted on the transmission electrode 41 is shifted. Thus, the phase of the electrical signal is changed, finally the electrical signal is coupled to the radiator 42 at a second hollow region 51 of the second metal electrode 50, and the radiator 42 radiates the signal outward. It is to be noted that the multiple radiators 42 are multiple independent radiators 42, and each radiator 42 radiates a signal outward.

Figure 10:
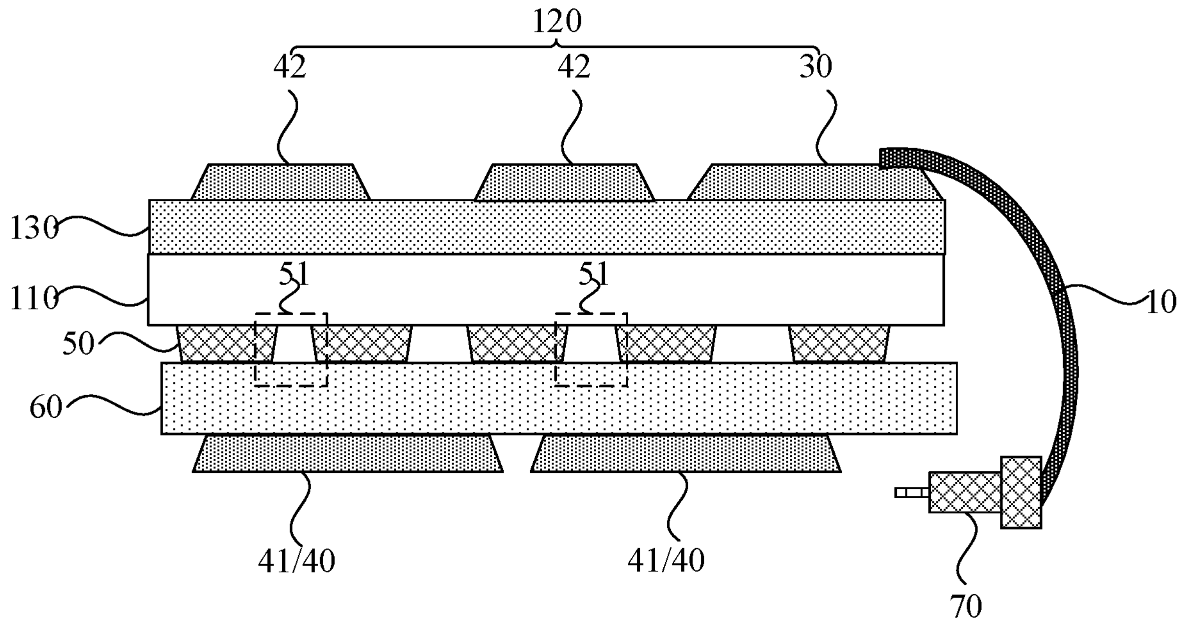
FIG. 10 is a sectional view of another antenna according to an embodiment of the present disclosure.

Optionally, FIG. 10 is a sectional view of another antenna according to an embodiment of the present disclosure. As shown in FIG. 10, a third flexible substrate 130 is further included, and the third metal electrode 120 is located on a side of the third flexible substrate 130 facing away from the first base plate 110.

The third flexible substrate 130 may, for example, include a flexible material such as polyimide. For example, the third flexible substrate 130 may be provided on a support base plate, the third metal electrode 120 is then provided on the side of the third flexible substrate 130 facing away from the support base plate, the support base plate is then peeled off, and the manufactured third flexible substrate 130 and the third metal electrode 120 located on the third flexible substrate 130 are attached to the side of the first base plate 110 facing away from the second metal electrode 50. Optionally, the support base plate may also be used as the first substrate 110 without being peeled off.

Figure 11:
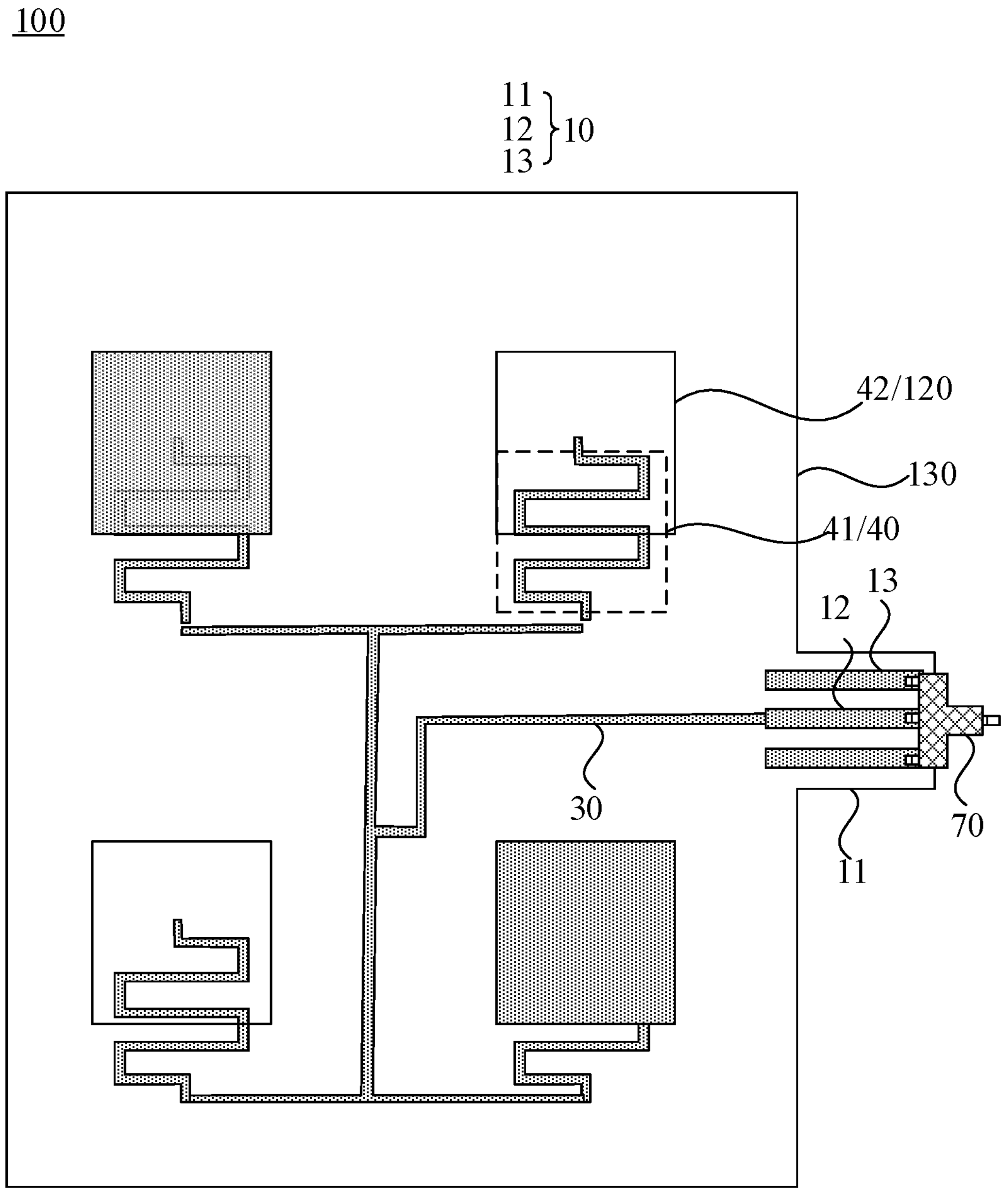
FIG. 11 is a top view of another antenna according to an embodiment of the present disclosure.
Figure 12:
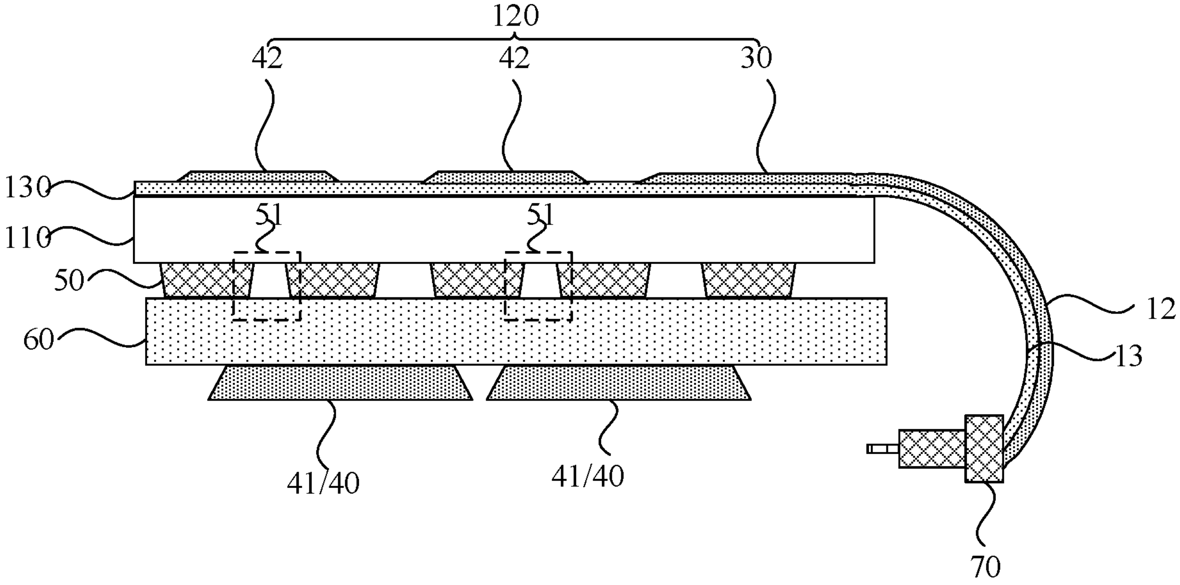
FIG. 12 is a sectional view of another antenna according to an embodiment of the present disclosure.

Optionally, FIG. 11 is a top view of another antenna according to an embodiment of the present disclosure; FIG. 12 is a sectional view of another antenna according to an embodiment of the present disclosure. As shown in FIGS. 11 and 12, the flexible coplanar waveguide 10 provided in embodiments of the present disclosure includes a flexible support layer 11 and a central band 12 and a grounding band 13 which are located on the flexible support layer 11; the third flexible substrate 130 and the flexible support layer 11 are disposed at the same layer; and the third metal electrode 120 further includes the central band 12 and the grounding band 13.

It is to be understood that the flexible coplanar waveguide 10 includes the flexible support layer 11 and the central band 12 and the grounding band 13 which are located on the flexible support layer 11. As can be seen from the above, during the manufacturing of the antenna, the third flexible substrate 130 may be first formed on the support base plate, and the third metal electrode 120 is then formed on the third flexible substrate 130. The flexible support layer 11 of the flexible coplanar waveguide 10 may be, for example, a flexible material such as polyimide. The third flexible substrate 130 may be, for example, a flexible material such as polyimide. That is, the third flexible substrate 130 and the flexible support layer 11 may be made of the same material. The central band 12 and the grounding band 13 are metal, for example, copper. The third metal electrode 120 may also be metal, for example, copper. That is, the third metal electrode 120, the central band 12, and the grounding band 13 may be made of the same material. Thus, in the embodiment of the present disclosure, when the third flexible substrate 130 is manufactured, the flexible support layer 11 of the flexible coplanar waveguide 10 is manufactured at the same time; when the third metal electrode 120 is manufactured on the third flexible substrate 130, the related metal structure of the flexible coplanar waveguide 10 is manufactured at the same time, for example, the central band 12 and the grounding band 13 are formed. Thus, the process is simplified.

Additionally, since the related metal structure of the flexible coplanar waveguide 10 and the third metal electrode 120 on the third flexible substrate 130 are disposed at the same layer, the related metal structure of the flexible coplanar waveguide 10 and the feed network 30 can be directly electrically connected to each other without an electrical connection through welding. Thus, there is no need to provide a frame for achieving the connection between the flexible coplanar waveguide 10 and the feed network 30, and the frame of the antenna 100 is further reduced.

Based on the position relationship between the transmission electrode 41 and the feed network 30, the specific positions of the feed network 30 and the flexible coplanar waveguide 10 are described. According to the above analysis, for the antenna 100 provided in the embodiment, the flexible coplanar waveguide 10 is provided between the coaxial cable connector 70 and the feed network 30, and the coaxial cable connector 70 feeds the radio frequency signal through the flexible coplanar waveguide 10. In this manner, the space originally used for setting a radio frequency signal interface on the antenna can be saved, thereby achieving the narrower frame.

In order to support the antenna and the like, optionally, the antenna may also be provided with at least one base plate. The structure when the antenna also includes the base plate will be described below with an example. The present application is not limited to the content described below.

Figure 13:
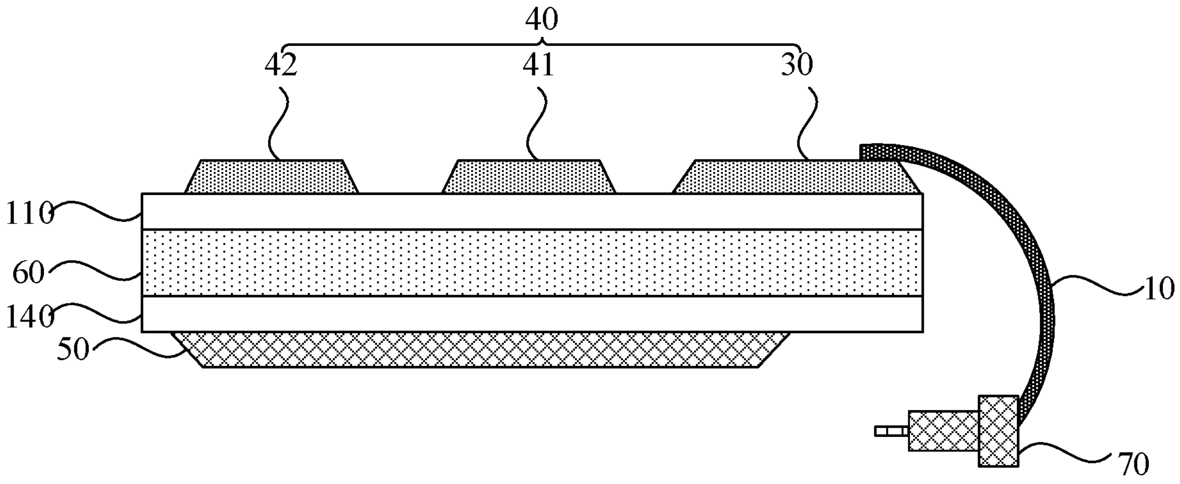
FIG. 13 is a sectional view of another antenna according to an embodiment of the present disclosure.

On the basis of various preceding embodiments, optionally, FIG. 13 is a sectional view of another antenna according to an embodiment of the present disclosure. As shown in FIG. 13, the antenna 100 provided in embodiments of the present disclosure further includes the first base plate 110 and a second base plate 140; the first base plate 110 and the second base plate 140 are located on two sides of the dielectric functional layer 60, respectively. FIG. 13 illustrates an example in which the first base plate 110 is located between the first metal electrode 40 and the dielectric functional layer 60 and the second base plate 140 is located between the dielectric functional layer 60 and the second metal electrode 50. However, the present application is not limited thereto, and setting may be performed according to actual situations by those skilled in the art. Exemplarily, the first metal electrode 40 is located between the second base plate 140 and the dielectric functional layer 60, the second metal electrode 50 is located between the first base plate 110 and the dielectric functional layer 60, and the like.

The antenna provided in the embodiment has a simple structure. In this manner, when the antenna 100 is manufactured, the process steps can be simplified and the manufacturing efficiency of the antenna 100 can be improved.

Figure 14:
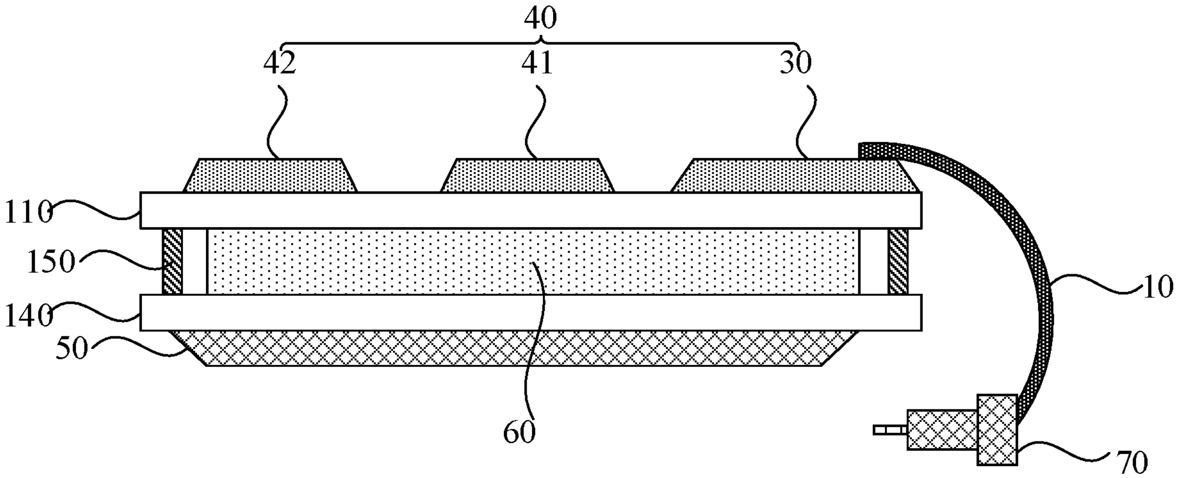
FIG. 14 is a sectional view of another antenna according to an embodiment of the present disclosure.

Optionally, FIG. 14 is a sectional view of another antenna according to an embodiment of the present disclosure. As shown in FIG. 14, the antenna 100 further includes a frame sealing structure 150. The frame sealing structure 150 is located between the first base plate 110 and the second base plate 140. The first base plate 110, the second base plate 140, and the frame sealing structure 150 form an accommodation space, and the dielectric functional layer 60 is disposed in the accommodation space.

The frame sealing structure 150 may be, for example, frame sealing glue. The frame sealing glue is sticky, has strong plasticity under the normal condition, and has mechanical properties when cured through light or in other manners. Therefore, the first base plate 110 and the second base plate 140 can be sealed by the frame sealing glue, and when the dielectric functional layer 60 is in a fluid state, leakage of the dielectric functional layer 60 can be prevented.

In the embodiment, the first base plate 110, the second base plate 140, and the frame sealing structure 150 form the accommodation space, and the dielectric functional layer 60 is disposed in the accommodation space. In this case, the dielectric functional layer 60 may be in a fluid state or a solid state. In this manner, the material of the dielectric functional layer 60 may be selected from a wider range and thus can be more flexibly selected.

Figure 15:
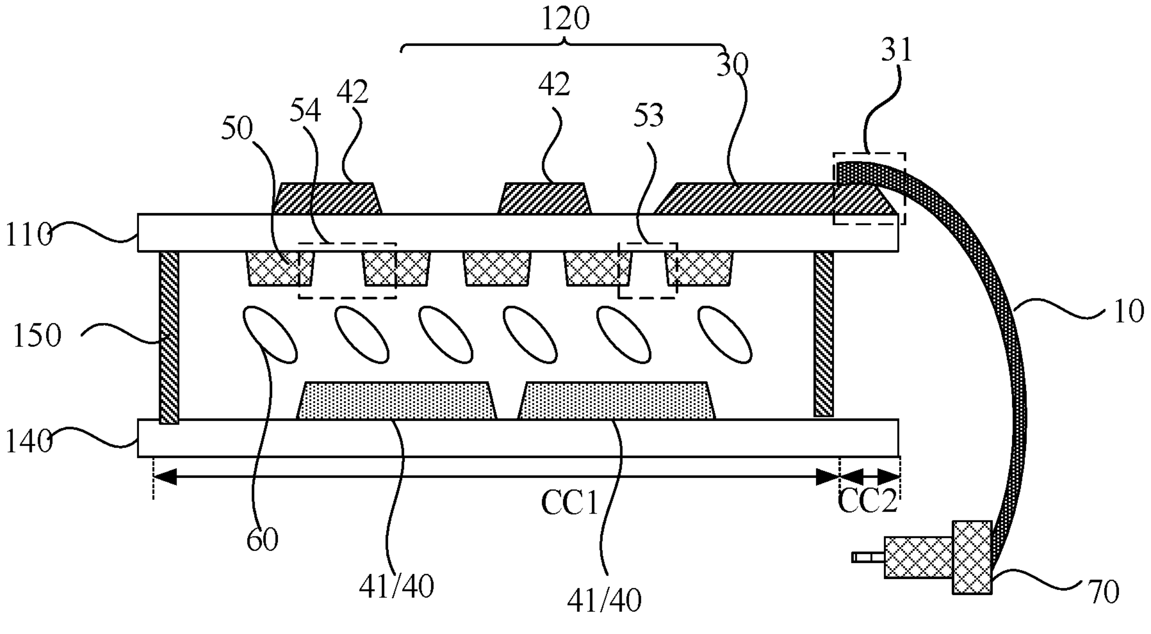
FIG. 15 is a sectional view of another antenna according to an embodiment of the present disclosure.

Optionally, FIG. 15 is a sectional view of another antenna according to an embodiment of the present disclosure. As shown in FIG. 15, the first base plate 110 is located on a side of the second metal electrode 50 facing away from the dielectric functional layer 60; the second base plate 140 is located on a side of the first metal electrode 40 facing away from the dielectric functional layer 60; and the second metal electrode 50 includes a plurality of first hollow structures 53, and vertical projections of the plurality of first hollow structures 53 on a plane where the first base plate 110 is located are within vertical projections of the plurality of transmission electrodes 41 on the plane where the first base plate 110 is located.

Exemplarily, the manufacturing steps of the antenna shown in FIG. 15 may be, for example, forming the first metal electrode 40 on the second base plate 140 and forming the second metal electrode 50 on the first base plate 110; attaching the second base plate 140 on which the first metal electrode 40 is formed and the first base plate 110 on which the second metal electrode 50 is formed in an aligned manner to form an accommodation space so that the frame sealing structure 150 and the dielectric functional layer 60 are located between the first base plate 110 and the second base plate 140, and the frame sealing structure 150 is disposed around the dielectric functional layer 60.

Optionally, with continued reference to FIG. 15, the antenna 100 further includes a third metal electrode 120; the third metal electrode 120 is located on a side of the first base plate 110 facing away from the second metal electrode 50 and includes the feed network 30; the first base plate 110 includes an electrode setting region CC1 and a first step region CC2; and a connecting part 31 between the feed network 30 and the flexible coplanar waveguide 10 is located in the first step region CC2, and a portion of the feed network 30 except for the connecting part 31 is located in the electrode setting region CC1. The electrode setting region CC1 and the first step region CC2 marked on the second substrate 140 are only for illustration, and the first substrate 110 is divided into the electrode setting region CC1 and the first step region CC2 in a direction perpendicular to the plane of the second substrate 140 (or the first substrate 110).

Optionally, with continued reference to FIG. 15, the antenna further includes a plurality of radiators 42; and the third metal electrode 120 includes the plurality of radiators 42.

In this embodiment, the flexible coplanar waveguide 10 is provided so that the coaxial cable connector 70 transmits the electrical signal to the feed network 30 through the flexible coplanar waveguide 10. There is no need to provide a large step for setting the radio frequency signal interface. The space originally used for setting the radio frequency signal interface on the antenna can be saved, and merely a small region, that is, the first step region CC2, is required to be reserved so as to achieve the connection between the flexible coplanar waveguide 10 and the feed network 30, thus achieving the narrower frame.

Optionally, a width of the first step region CC2 is less than or equal to 2 μm. It can be seen that the width of the first step region CC2 is greatly reduced compared with that of the step region required to be used for the connection of the coaxial cable connector. That is, the frame size of the antenna is small. When the antenna is applied to a device, the miniaturization of the device is facilitated; and when the antenna is used for splicing, splicing between antennas is facilitated.

It is to be noted that FIG. 15 illustrates an example in which the feed network 30 and the flexible coplanar waveguide 10 are connected in a manner of welding. It is to be understood that when the antenna further includes the second flexible substrate and the third metal electrode, the flexible support layer of the flexible coplanar waveguide and the second flexible substrate are an integrated structure, and the third metal electrode includes the central band and grounding band of the flexible coplanar waveguide and the feed network. For example, see the second flexible substrate 130 and the third metal electrode 120 as shown in FIG. 12.

Figure 16:
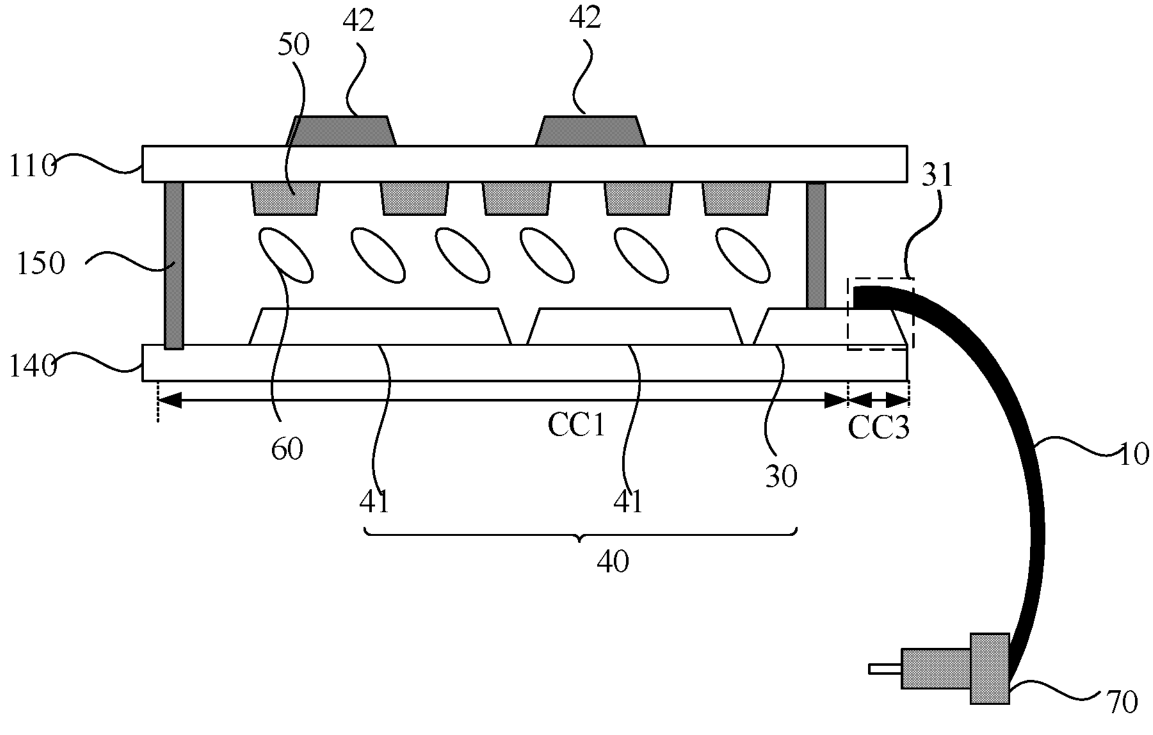
FIG. 16 is a sectional view of another antenna according to an embodiment of the present disclosure.

Optionally, FIG. 16 is a sectional view of another antenna according to an embodiment of the present disclosure. The first metal electrode 40 includes the feed network 30; the second base plate 140 includes an electrode setting region CC1 and a second step region CC3; and a connecting part 31 between the feed network 30 and the flexible coplanar waveguide 10 is located in the second step region CC3, and a portion of the feed network 30 except for the connecting part 31 is located in the electrode setting region CC1.

In this embodiment, the flexible coplanar waveguide 10 is provided so that the coaxial cable connector 70 transmits the electrical signal to the feed network 30 through the flexible coplanar waveguide 10. There is no need to provide a large step for setting the radio frequency signal interface. The space originally used for setting the radio frequency signal interface on the antenna can be saved, and merely a small region, that is, the second step region CC3, is required to be reserved so as to achieve the connection between the flexible coplanar waveguide 10 and the feed network 30, thus achieving the narrower frame.

It is to be noted that FIGS. 15 and 16 illustrate an example in which the dielectric functional layer 60 is a liquid crystal layer, but the present application is not limited thereto. The type of the dielectric functional layer 60 can be selected by those skilled in the art according to actual situations.

Figure 17:
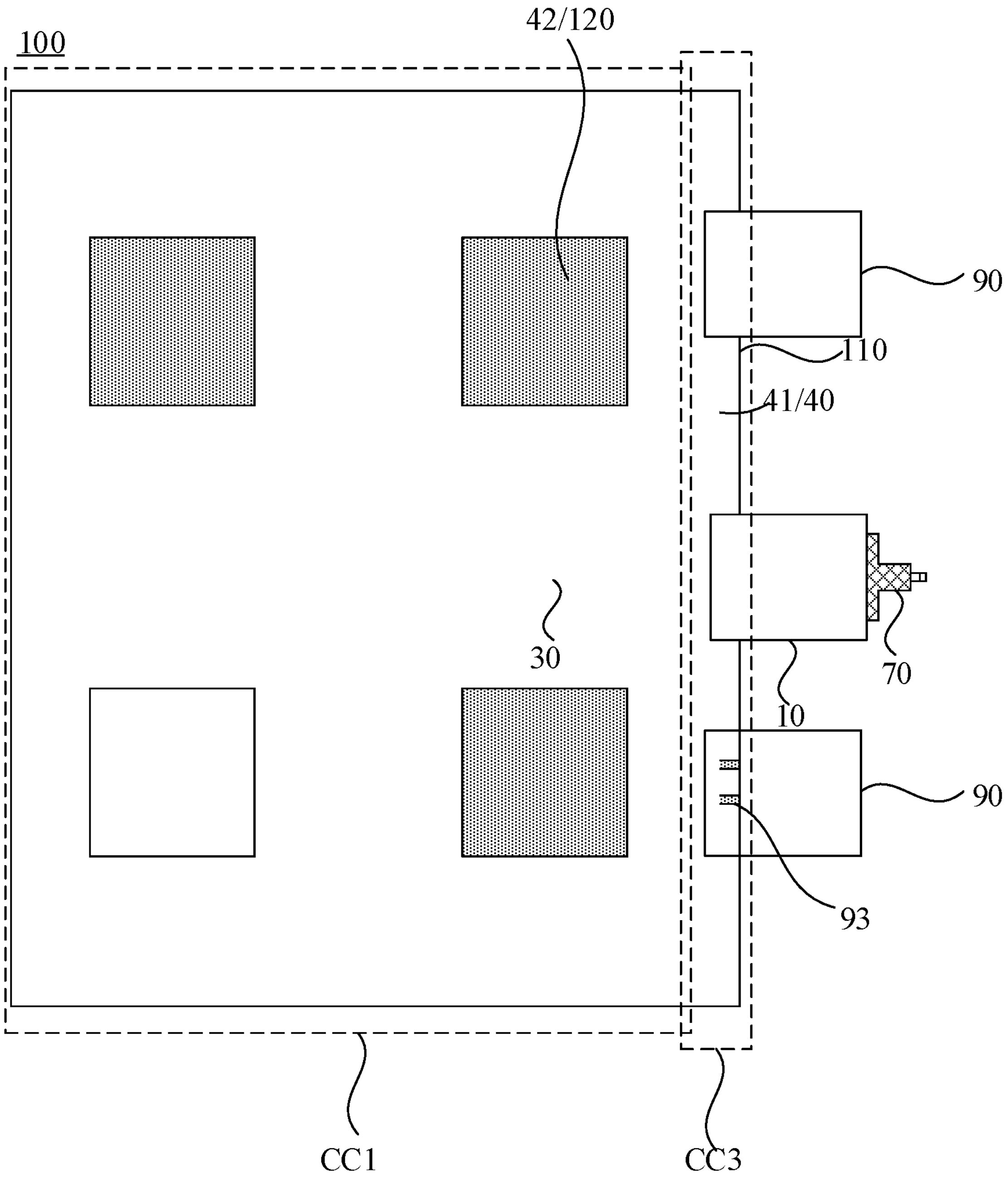
FIG. 17 is a top view of another antenna according to an embodiment of the present disclosure.

Optionally, FIG. 17 is a top view of another antenna according to an embodiment of the present disclosure. As shown in FIG. 17, the antenna 100 further includes a flexible circuit board 90; the flexible circuit board 90 is electrically connected to a transmission electrode 41 through a binding terminal 93; and the binding terminal 93 is disposed in the second step region CC3.

In this embodiment, the second step region CC3 is provided with not only a connecting part connecting the flexible coplanar waveguide 10 and the feed network 30, but also a binding terminal 93 connecting the flexible circuit board 90 and the transmission electrode 41, so that the frame of the antenna 100 is further reduced without providing corresponding step regions for the connecting part and the binding terminal. For example, a width of the second step region CC3 of the antenna is less than or equal to 2 μm. It can be seen that the width of the second step region CC3 is greatly reduced compared with that of the step region required to be used for the connection of the coaxial cable connector. That is, the frame size of the antenna is small. When the antenna is applied to a device, the miniaturization of the device is facilitated; and when the antenna is used for splicing, splicing between antennas is facilitated.

It is to be noted that FIGS. 16 and 17 illustrate an example in which the feed network 30 and the flexible coplanar waveguide 10 are connected in a manner of welding and the flexible circuit board 90 is electrically connected to the transmission electrode 41 through the binding terminal 93. It is to be understood that when the antenna further includes the first flexible substrate, the flexible support layer of the flexible coplanar waveguide and the second flexible substrate of the flexible circuit board may be integrated with the first flexible substrate, and the first metal electrode includes a transmission electrode, a metal transmission line of the flexible circuit board, a central band and grounding band of the flexible coplanar waveguide, and a feed network. For example, see the first flexible substrate 80 and the first metal electrode 40 as shown in FIG. 7.

Based on the same inventive concept, a manufacturing method of an antenna is further provided in embodiments of the present disclosure and is used for manufacturing the display panel as shown in FIG. 3 in the preceding embodiment. The method has the beneficial effects of the display panel in the preceding embodiment. The similarities can be understood with reference to the description of the preceding display panel and will not be repeated hereinafter.

Figure 18:
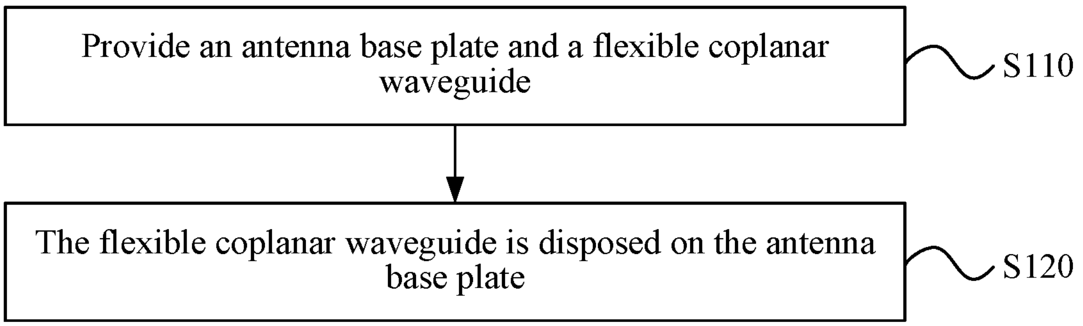
FIG. 18 is a flowchart of a manufacturing method of an antenna according to an embodiment of the present disclosure.
Figure 19:
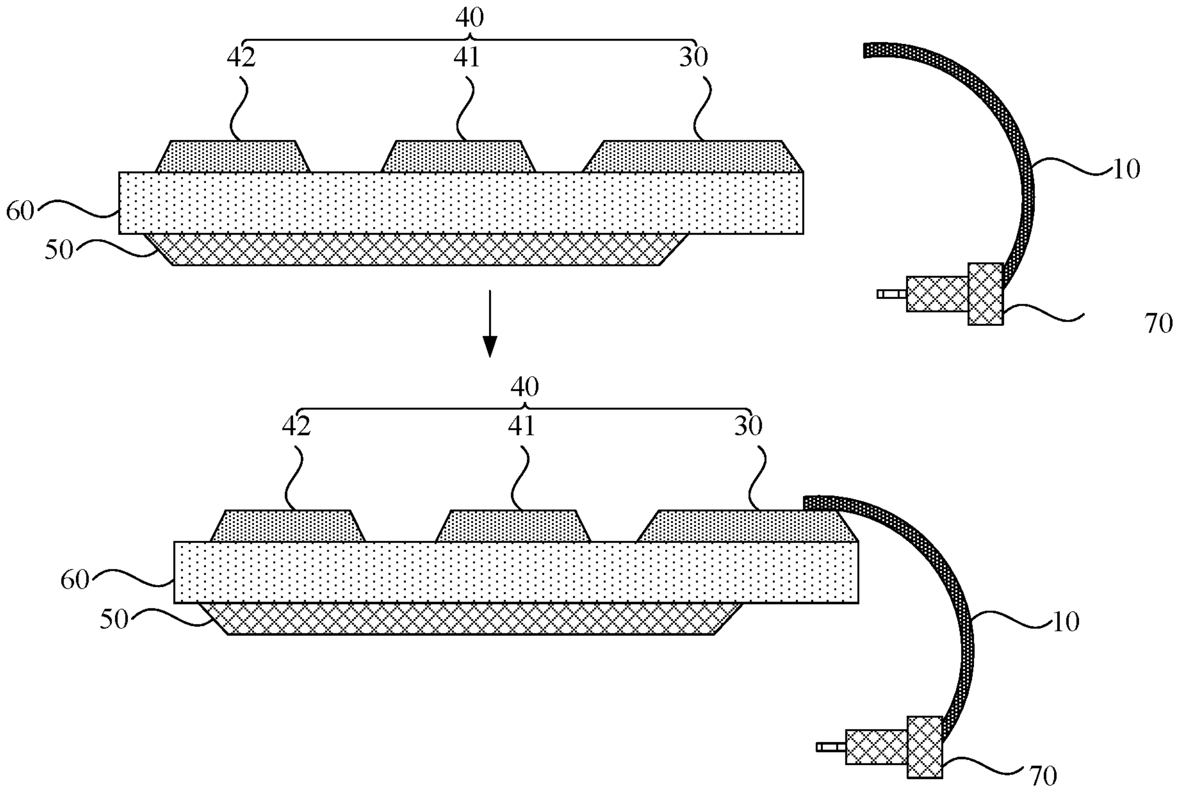
FIG. 19 is a process flowchart of a manufacturing method of an antenna according to an embodiment of the present disclosure.

FIG. 18 is a flowchart of a manufacturing method of an antenna according to an embodiment of the present disclosure. FIG. 19 is a process flowchart of a manufacturing method of an antenna according to an embodiment of the present disclosure. As shown in FIGS. 18 and 19, the manufacturing method of an antenna provided in embodiments of the present disclosure specifically includes the steps described below.

In S110, an antenna base plate and a flexible coplanar waveguide are provided. The antenna base plate includes a first metal electrode, a second metal electrode, a dielectric functional layer, and a feed network. The first metal electrode and the second metal electrode are located on two opposite sides of the dielectric functional layer, respectively. The first metal electrode includes a plurality of transmission electrodes.

In S120, the flexible coplanar waveguide is disposed on the antenna base plate. The flexible coplanar waveguide is electrically connected to the feed network and configured to feed an electrical signal to the feed network.

The flexible coplanar waveguide is disposed on the antenna base plate in a manner of welding or binding, for example.

According to the manufacturing method of an antenna provided by the embodiment, the flexible coplanar waveguide is disposed between the coaxial cable connector and the feed network, and the coaxial cable connector achieves the feeding of a radio frequency signal through the flexible coplanar waveguide. In this manner, the space originally used for setting a radio frequency signal interface on the antenna can be saved, thereby achieving the narrower frame. When the manufactured antenna is applied to a device, the miniaturization of the device is facilitated; and when the antenna is used for splicing, splicing between antennas is facilitated.

Based on the same inventive concept, a manufacturing method of an antenna is further provided in embodiments of the present disclosure and is used for manufacturing the display panel as shown in FIG. 6 in the preceding embodiment. The method has the beneficial effects of the display panel in the preceding embodiment. The similarities can be understood with reference to the description of the preceding display panel and will not be repeated hereinafter.

Figure 20:
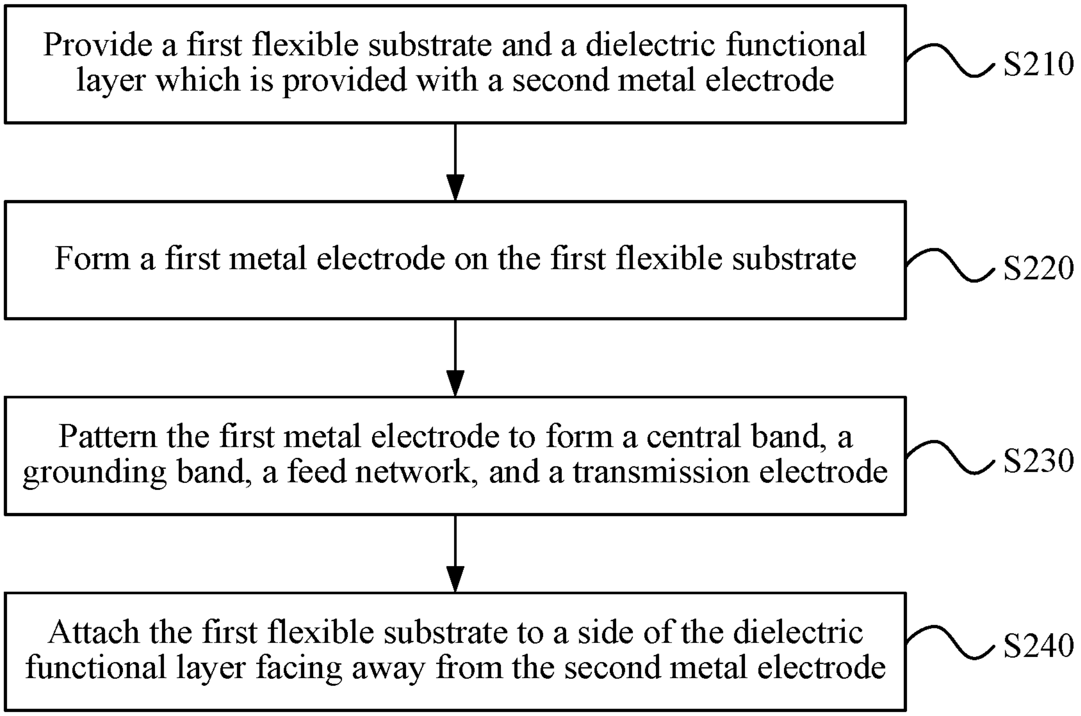
FIG. 20 is a flowchart of another manufacturing method of an antenna according to an embodiment of the present disclosure.

FIG. 20 is a flowchart of another manufacturing method of an antenna according to an embodiment of the present disclosure. As shown in FIG. 20, the manufacturing method of an antenna in the embodiment of the present disclosure specifically includes steps described below.

In S210, a first flexible substrate and a dielectric functional layer which is provided with a second metal electrode are provided.

In S220, a first metal electrode is formed on the first flexible substrate.

In S230, the first metal electrode is patterned to form a central band, a grounding band, a feed network, and a transmission electrode.

In S240, the first flexible substrate is attached to a side of the dielectric functional layer facing away from the second metal electrode. The central band, the grounding band, and the first flexible substrate form a flexible coplanar waveguide.

Optionally, the step of patterning the first metal electrode to form the central band, the grounding band, the feed network, and the transmission electrode includes: patterning the first metal electrode to form the central band, the grounding band, the feed network, the transmission electrode, and a transmission electrode line. The transmission electrode line and the first flexible substrate form a flexible circuit board.

The manufacturing method of an antenna is used for manufacturing the display panel as shown in FIG. 7 in the preceding embodiment. The method has the beneficial effects of the display panel in the preceding embodiment. The similarities can be understood with reference to the description of the preceding display panel and will not be repeated hereinafter.

Based on the same inventive concept, a manufacturing method of an antenna is further provided in embodiments of the present disclosure and is used for manufacturing the display panel as shown in FIG. 12 in the preceding embodiment. The method has the beneficial effects of the display panel in the preceding embodiment. The similarities can be understood with reference to the description of the preceding display panel and will not be repeated hereinafter.

Figure 21:
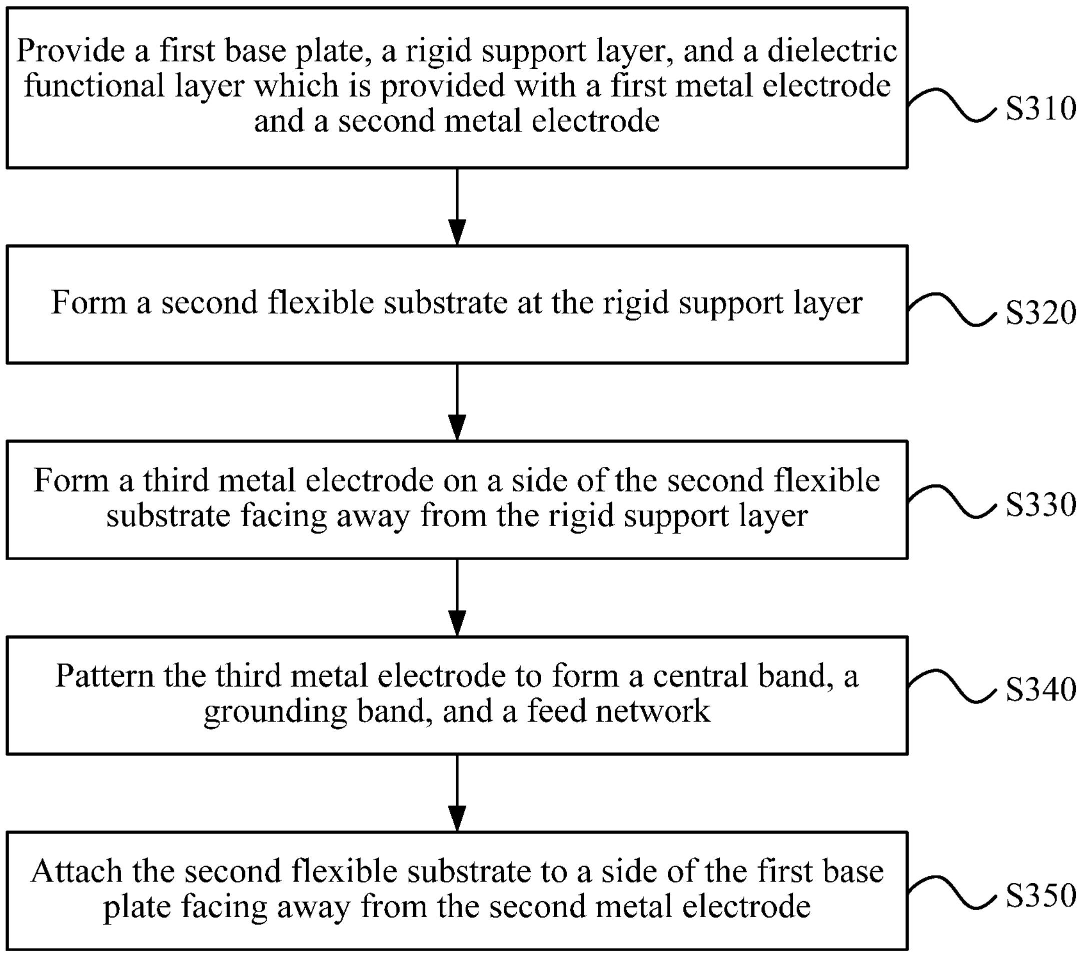
FIG. 21 is a flowchart of another manufacturing method of an antenna according to an embodiment of the present disclosure.

FIG. 21 is a flowchart of another manufacturing method of an antenna according to an embodiment of the present disclosure. As shown in FIG. 21, the manufacturing method of an antenna in the embodiment of the present disclosure specifically includes steps described below.

In S310, a first base plate, a rigid support layer, and a dielectric functional layer which is provided with a first metal electrode and a second metal electrode are provided. The first metal electrode and the second metal electrode are located on two opposite sides of the dielectric functional layer.

In S320, a second flexible substrate is formed at the rigid support layer.

In S330, a third metal electrode is formed on a side of the second flexible substrate facing away from the rigid support layer.

In S340, the third metal electrode is patterned to form a central band, a grounding band, and a feed network.

In S350, the second flexible substrate is attached to a side of the first base plate facing away from the second metal electrode. The central band, the grounding band, and the second flexible substrate form a flexible coplanar waveguide.

Optionally, the rigid support layer is also used as the first base plate. That is, there is no need to peel off the rigid support layer, simplifying the process steps and improving the manufacturing efficiency of the antenna.

It is to be understood that when the rigid support layer is also used as the first base plate, the rigid support layer below the flexible coplanar waveguide 10 may be cut off in a manner of laser cutting, so that the flexible coplanar waveguide 10 can implement the bending function.

It is to be noted that the preceding are only preferred embodiments of the present disclosure and the technical principles used therein. It is to be understood by those skilled in the art that the present disclosure is not limited to the embodiments described herein. Those skilled in the art can make various apparent modifications, adaptations, and substitutions without departing from the scope of the present disclosure. Therefore, while the present disclosure has been described in detail via the preceding embodiments, the present disclosure is not limited to the preceding embodiments and may include more equivalent embodiments without departing from the inventive concept of the present disclosure. The scope of the present disclosure is determined by the scope of the appended claims.

What is claimed is:

1. An antenna, comprising a first metal electrode, a second metal electrode, and a dielectric functional layer, wherein the first metal electrode and the second metal electrode are located on two opposite sides of the dielectric functional layer, respectively; and the first metal electrode comprises a plurality of transmission electrodes; and the antenna further comprises:

a flexible coplanar waveguide and a feed network, wherein the flexible coplanar waveguide is electrically connected to the feed network and configured to feed an electrical signal to the feed network;

wherein the feed network is disposed at a same layer as the plurality of transmission electrodes;

the antenna further comprises a first flexible substrate, wherein the first metal electrode is disposed on the first flexible substrate;

wherein the flexible coplanar waveguide comprises a flexible support layer, and a central band and a grounding band which are located on the flexible support layer;

the first flexible substrate and the flexible support layer are an integrated structure; and the first metal electrode further comprises the central band and the grounding band;

wherein the antenna further comprises a flexible circuit board;

wherein the flexible circuit board comprises a second flexible substrate and a metal transmission line located on the second flexible substrate;

the first flexible substrate, the second flexible substrate, and the flexible support layer are an integrated structure; and the first metal electrode further comprises the metal transmission line.

2. The antenna of claim 1, wherein a fixed potential is provided for the second metal electrode.

3. The antenna of claim 1, wherein the dielectric functional layer comprises a photo-dielectric change layer or a liquid crystal layer.

4. A method of manufacturing an antenna, comprising:

providing an antenna base plate and a flexible coplanar waveguide, wherein the antenna base plate comprises a first metal electrode, a second metal electrode, a dielectric functional layer, and a feed network; the first metal electrode and the second metal electrode are located on two opposite sides of the dielectric functional layer, respectively; and the first metal electrode comprises a plurality of transmission electrodes;

disposing the flexible coplanar waveguide on the antenna base plate, wherein the flexible coplanar waveguide is electrically connected to the feed network and configured to feed an electrical signal to the feed network; wherein the feed network is disposed at a same layer as the plurality of transmission electrodes;

providing a first flexible substrate, wherein the first metal electrode is disposed on the first flexible substrate; wherein the flexible coplanar waveguide comprises a flexible support layer, and a central band and a grounding band which are located on the flexible support layer; the first flexible substrate and the flexible support layer are an integrated structure; and the first metal electrode further comprises the central band and the grounding band; and providing a flexible circuit board, wherein the flexible circuit board comprises a second flexible substrate and a metal transmission line located on the second flexible substrate; the first flexible substrate, the second flexible substrate, and the flexible support layer are an integrated structure; and the first metal electrode further comprises the metal transmission line.

* * * * *